(12) United States Patent
Müller-Fischer et al.

(10) Patent No.: US 7,586,489 B2
(45) Date of Patent: Sep. 8, 2009

(54) METHOD OF GENERATING SURFACE DEFINED BY BOUNDARY OF THREE-DIMENSIONAL POINT CLOUD

(75) Inventors: Matthias Heinz Müller-Fischer, Männedorf (CH); Simon David Schirm, Zürich (CH); Stefan Felix Duthaler, Bettingen (CH)

(73) Assignee: NVIDIA Corporation, Santa Clara, CA (US)

( * ) Notice: Subject to any disclaimer, the term of this patent is extended or adjusted under 35 U.S.C. 154(b) by 513 days.

(21) Appl. No.: 11/193,531

(22) Filed: Aug. 1, 2005

(65) Prior Publication Data
US 2007/0024620 A1 Feb. 1, 2007

(51) Int. Cl.
G06T 15/10 (2006.01)
(52) U.S. Cl. .................. 345/427; 345/419; 345/420
(58) Field of Classification Search ............ 345/427, 345/419, 582; 463/30; 348/51
See application file for complete search history.

(56) References Cited

U.S. PATENT DOCUMENTS

| | | | | |
|---|---|---|---|---|
| 5,107,444 | A * | 4/1992 | Wu | 345/419 |
| 5,255,352 | A * | 10/1993 | Falk | 345/582 |
| 2002/0090993 | A1* | 7/2002 | Koshiro et al. | 463/30 |
| 2006/0012597 | A1* | 1/2006 | Chakraborty | 345/419 |
| 2006/0132597 | A1* | 6/2006 | Mashitani et al. | 348/51 |

OTHER PUBLICATIONS

Cornelis, Nico and Van Gool, Luc, Real-Time Connectivity Constrained Depth Map Computation using Programmable Graphics Hardware, Jun. 20-25, 2005, http://ieeexplore.ieee.org/xpls/abs_all.jsp?arnumber=1467389.*
Shade, Jonathan, Gortler, Steven; He, Li-wei; Szeliski, Richard; Layered Depth Images, 1998, International Conference on Computer Graphics and Interactive Techniques, Proceedings of the 25th annual conference on Computer graphics and interactive techniques, pp. 231-242.*
Jeong, Won-Ki, Kähler, Kolja; Haber, Jörg; Seidel, Hans-Peter; Automatic Generation of Subdivision Surface Head Models from Point Cloud Data, Graphics Interface, 2002, Max-Planck-Institut für Informatik, pp. 1-8.*
Cornelis, Nico and Van Gool, Luc, "Real-Time Connectivity Constrained Depth Map Computation using Programmable Graphics Hardware," Proceedings of the 2005 IEEE Computer Society Conference on Computer Vision and Pattern Recognition (CYPR'05), vol. 1-vol. 01.
International Search Report. Aug. 6, 2008.

* cited by examiner

Primary Examiner—Xiao M Wu
Assistant Examiner—Phi Hoang
(74) Attorney, Agent, or Firm—Patterson & Sheridan, LLP

(57) ABSTRACT

Disclosed is a method of generating a three-dimensional (3D) surface defined by a boundary of a 3D point cloud. The method comprises generating density and depth maps from the 3D point cloud, constructing a 2D mesh from the depth and density maps, transforming the 2D mesh into a 3D mesh, and rendering 3D polygons defined by the 3D mesh.

23 Claims, 11 Drawing Sheets

METHOD OF GENERATING SURFACE DEFINED BY BOUNDARY OF THREE-DIMENSIONAL POINT CLOUD

BACKGROUND OF THE INVENTION

1. Field of the Invention

The present invention relates generally to a method of generating a three-dimensional (3D) surface for a virtual display system. More particularly, the invention relates to a method of generating a 3D surface defined by a boundary of a 3D point cloud.

2. Description of the Related Art

Generating complex 3D surfaces is among the more computationally expensive tasks performed by contemporary virtual display systems such as personal computers (PCs) and gaming consoles. For example, a complex 3D surface may be composed of millions of tiny shapes that must be individually rendered in order to generate the surface, and rendering each of the shapes generally requires performing a large number of mathematical operations such as geometric transformations, coordinate transformations, viewing and clipping transformations, lighting, shading, and hidden surface removal, to name but a few. Because of the high computational cost associated with generating complex 3D surfaces, more efficient ways to perform 3D surface generation are constantly sought after.

One particular area where improved surface rendering techniques are needed is in real-time virtual display environments. In order to produce a realistically animated real-time display, surfaces typically need to be rendered at a rate of at least 25 frames per second. Unfortunately, the frame rate generally places a practical limitation on the complexity of surfaces that can be rendered. However, as the efficiency of rendering algorithms increases, the complexity of surfaces that can be rendered within a given frame rate increases accordingly.

One type of complex 3D surface that arises in real-time virtual display environments are surfaces defined by boundaries of 3D point clouds. The 3D point cloud may represent, for example, a collection of independent particles such as those constituting a fluid. The boundary of the particle collection is rendered to give the appearance of the surface of the fluid.

Perhaps the most popular way of rendering 3D surfaces defined by boundaries of 3D point clouds is a technique known as Marching Cubes. The Marching Cubes technique is well known, and hence a lengthy discussion thereof is not provided herein. Briefly, the Marching Cubes technique is performed by defining a 3D grid of cubes encompassing a 3D point cloud. Each of the cubes is then "marched through" and corners of the cubes are individually tested to determine whether they are inside or outside of a boundary of the 3D point cloud. Each cube is then replaced with an appropriate polygon depending on which of the cube's corners are inside and outside of the boundary.

The Marching Cubes technique has at least two problems when it comes to generating surfaces in a real-time display environment. The first problem is that it marches through the cubes in a view independent manner. Because many of the cubes may not actually be visible to a viewer in the display environment, compute cycles are unnecessary wasted by marching through the non-visible cubes. The second problem with the Marching Cubes technique is that it marches through a 3D dataset, even though the 3D surface produced thereby is generally rendered in 2D. This also adds unnecessary computational cost to generating the 3D surface.

Methods operating in screen space, e.g., ray tracing and point splatting, overcome these problems by rendering the 3D surface in a strictly view dependent manner. For example, in ray tracing, a ray is cast into a scene from each pixel in a display. The rays are then traced along reflected and refracted directions to yield scene details from the perspective of each pixel.

Unfortunately, the performance of screen space approaches such as ray tracing and point splatting tend to be even slower than that of the Marching Cubes technique. One reason is because these screen space approaches fail to make use of specialized graphics acceleration hardware such as the triangle rendering pipeline included in most contemporary virtual display systems.

Embodiments of the present invention overcome at least the above limitations of conventional approaches to provide more efficient ways of generating 3D surfaces defined by boundaries of 3D point clouds.

SUMMARY OF THE INVENTION

Recognizing the need for more efficient approaches to rendering complex 3D surfaces, embodiments of the present invention provide a method of generating a 3D surface defined by a boundary of a 3D point cloud. In various embodiments, the 3D surface is generated by projecting the 3D point cloud onto a 2D projection plane, generating a 2D mesh defining a connectivity between the projected points, and transforming the 2D mesh into a 3D mesh.

According to one embodiment of the invention, a method of generating a 3D surface defined by a boundary of a 3D point cloud comprises generating a depth map and a density map from the 3D point cloud, generating a 2D mesh from the depth map and the density map, and transforming the 2D mesh into a 3D mesh.

In one related aspect, some embodiments generate the depth map by initializing a plurality of depth values on a 2D projection plane, projecting the 3D points onto the 2D projection plane to generate a plurality of projected points in the projection plane, and updating the depth values according to coordinates of the projected points. In another related aspect, some embodiments generate the density map by initializing a plurality of density values on the 2D projection plane and updating the density values according to the coordinates of the projected points.

The 2D projection plane may comprise a 2D grid of cells defined by a plurality of nodes. Each of the nodes may be further characterized by a depth value, a density value, and a location in the projection plane. The depth value and location of each node in the projection plane may define coordinates for the node.

In certain embodiments, the 2D mesh is generated by designating each node in the 2D grid as an interior node or an exterior node and applying one of a plurality of mesh patterns to each cell in the 2D grid based on a pattern of interior and exterior nodes in the cell. The mesh patterns may define connectivities for polygons (e.g., triangles) formed in the 2D mesh.

The 2D mesh may be transformed into a 3D mesh by multiplying coordinates of each node in the 2D mesh by an inverse of a projection matrix used to project the 3D point cloud onto the projection plane.

The method finds ready application in tasks such as visualization of particle based fluids models and it can be implemented in a computational platform including at least one of a physics processing unit (PPU), a graphics processing unit (GPU) and/or a central processing unit (CPU).

BRIEF DESCRIPTION OF THE DRAWINGS

Exemplary embodiments of the invention are described below in relation to the accompanying drawings. In the drawings.

DESCRIPTION OF THE EXEMPLARY EMBODIMENTS

Embodiments of the invention provide a method of generating a three-dimensional (3D) surface defined by the boundary of a 3D point cloud. According to the method, a depth map and a density map are formed from the 3D point cloud. The depth and density maps are then used to form a two-dimensional (2D) mesh representing the 3D surface by defining connectivity between points in the 3D point cloud. The 2D mesh is transformed into a 3D mesh defining 3D graphics primitives, which are then rendered in a virtual display system.

The term "3D point cloud" used herein denotes any plurality of three dimensionally related points, e.g., a finite set of 3D points. Each point in the 3D point cloud may be generally represented by a vector $[x, y, z]^T$ in Cartesian space or a vector $[x, y, z, 1]^T$ in homogeneous coordinates.

The term "virtual display system" used herein refers to any combination of hardware and/or software capable of rendering a 3D surface. For example, the virtual display system may comprise a computational platform operatively connected to a display system such as a monitor or a projector. Selected examples of computational platforms capable of rendering a 3D surface are disclosed in U.S. patent applications with Ser. Nos. 10/715,459 and 10/715,440 filed Nov. 19, 2003, Ser. No. 10/815,721 filed Apr. 2, 2004, Ser. No. 10/839,155 filed May 6, 2004, Ser. No. 10/982,791 filed Nov. 8, 2004, and Ser. No. 10/988,588 filed Nov. 16, 2004.

Computational platforms such as those described in the above references may also be used to implement the method of generating a 3D surface. For example, the 3D mesh may be generated from the 3D point cloud by using a graphics processing unit (GPU), a physics processing unit (PPU), a central processing unit (CPU), or some combination of these three (3) computational devices or associated systems/sub-subsystems.

Figure 1:
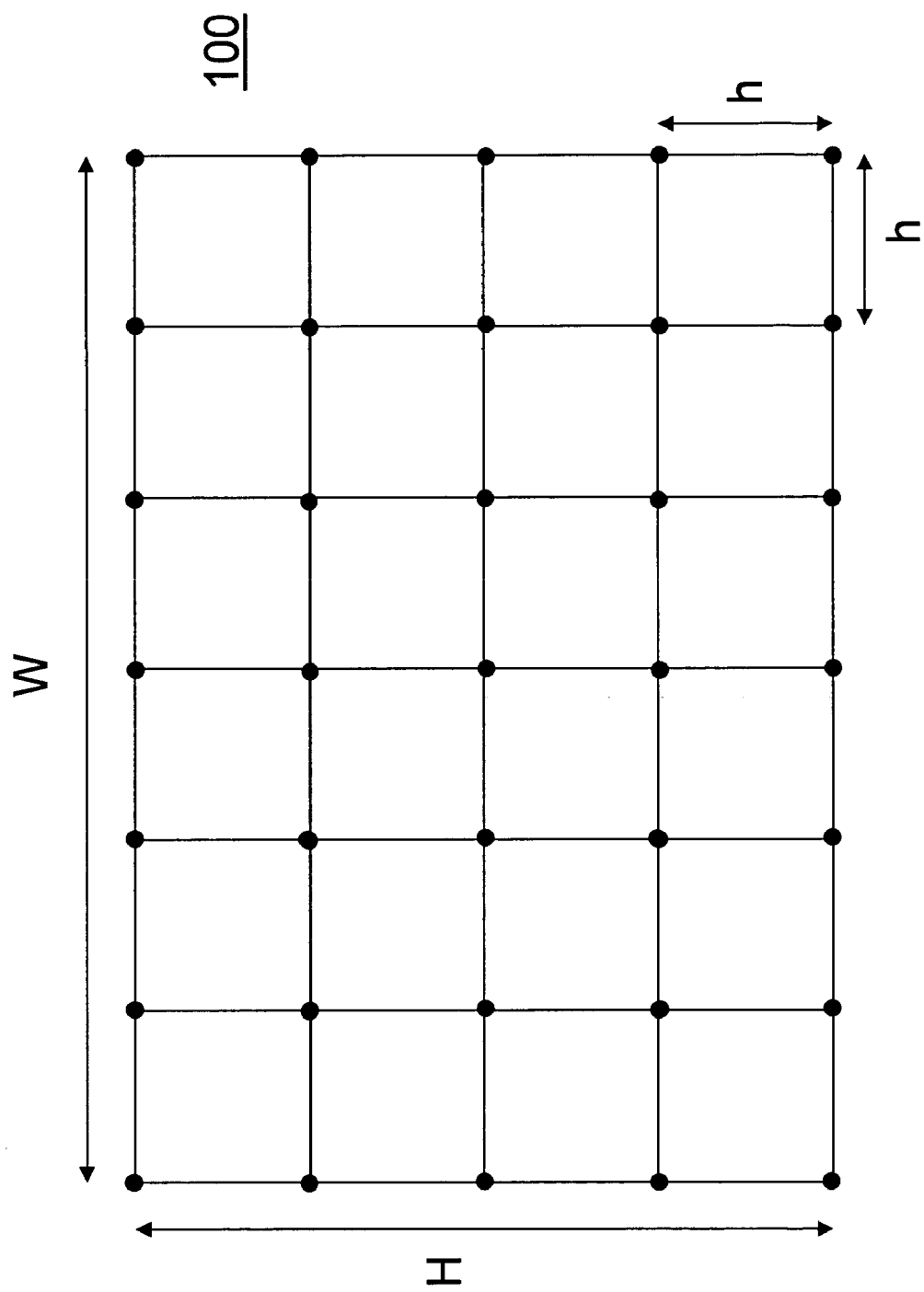
FIG. 1 shows a rectangular 2D grid as an example of a projection plane used for generating 3D surfaces according to selected embodiments of the invention.

The depth and density maps are typically formed in relation to a 2D projection plane (e.g., a grid) characterized by a plurality of cells, wherein each one of the plurality of cells is bordered by a plurality of nodes. For example, FIG. 1 shows a rectangular 2D grid 100 having height "H" and width "W," and comprising a plurality of evenly spaced square cells. (A regular grid with square cells is used in the illustrated example, but a non-regular grid with any geometrically reasonable cells might be alternately used). Each of the cells in 2D grid 100 is characterized by a cell size parameter "h" (i.e., each cell has a height and a width of "h"), and by nodes located at the corners of each cell. Accordingly, 2D grid 100 defines an array of nodes having $$N_x = \left\lceil \frac{W}{h} \right\rceil + 1$$

rows and $$N_y = \left\lceil \frac{H}{h} \right\rceil + 1$$

columns. Node locations within 2D grid 100 are denoted by indices (i,j), where i denotes a row in 2D grid 100 and j denotes a column in 2D grid 100.

Figure 2:
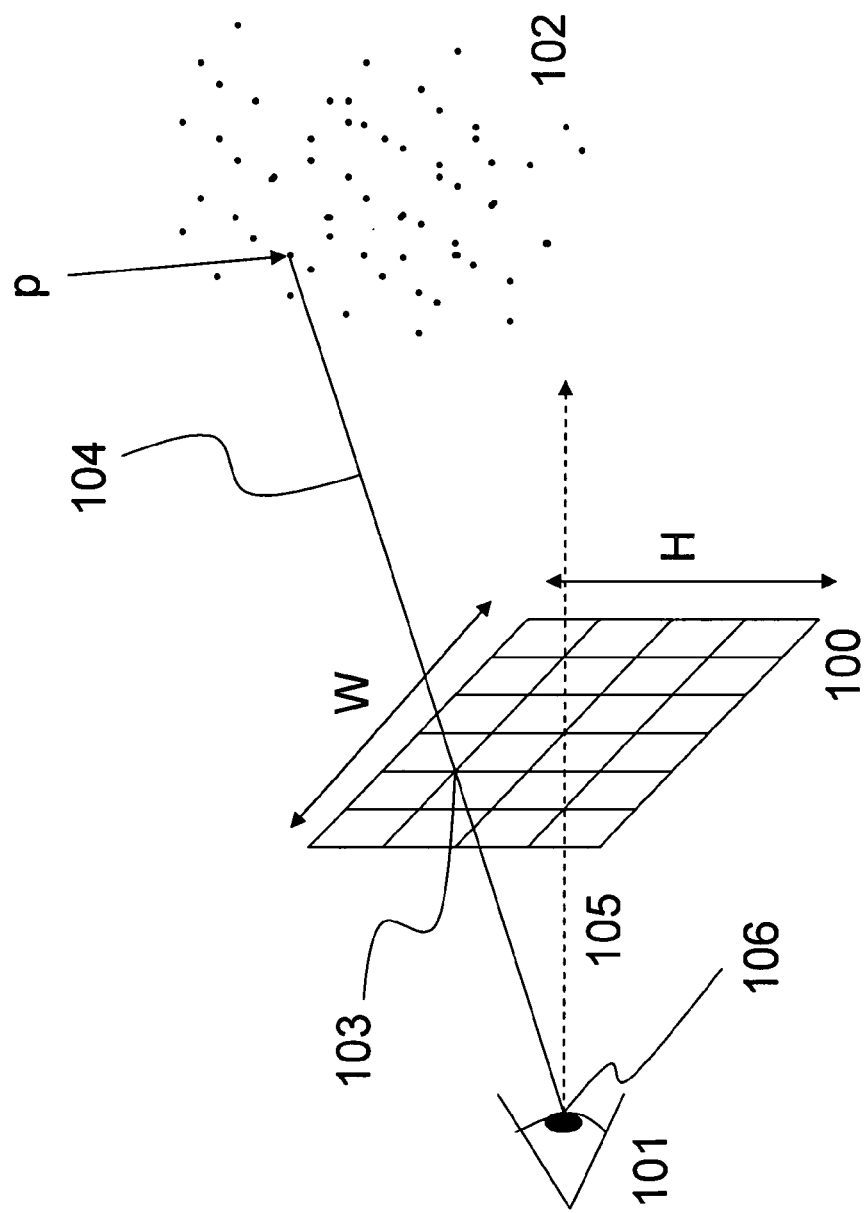
FIG. 2 shows the 2D grid of FIG. 1 positioned as a projection plane for a 3D point cloud.

However defined, the projection plane is subsequently used to "project" points from the 3D point cloud. "Projection" is a process of relating relevant points in the 3D point cloud to the projection plane using a defined set of relationships. For example, FIG. 2 shows a 2D grid 100 positioned as a projection plane for 3D point cloud 102. That is, the projection plane shown in FIG. 2 is defined in relation to a field of view (e.g., a camera perspective) having an optical axis 105 passing through the center of 2D grid 100 and an optical point of origin 106. For purposes of the present explanation, it is assumed that optical axis 105 extends in the "z" direction through 2D grid 100 which is placed in the x/y plane in order to relatively define a horizontal "x" direction and a vertical "y" direction.

With the reference projection plane in position, individual points within the 3D point cloud 102 may be projected onto 2D grid 100 along respective projection lines extending from optical origin 106, through 2D grid 100, and thence to the point being projected. For example, a point "p" in 3D point cloud 102 is projected onto 2D grid 100 along a projection line 104 passing through a node 103 in 2D grid 100. Although the example shown in FIG. 2 illustrates a perspective projection, other types of projection, such as parallel or even non-linear forms of projection, might alternatively be used.

Generically speaking, a "depth map" is a 2D representation of a 3D dataset. In the working example, a depth map is formed by assigning a "depth value" to each node in the projection plane (e.g., 2D grid 100). The term "depth value" typically denotes a distance measured between some reference point associated with the projection plane to some other point associated with the 3D dataset being projected (e.g., 3D point cloud 102). For example, the depth value might be defined as the distance from some node in the projection plane to a closest point in 3D point cloud 102, as measured along a defined projection axis. In a more particular example with reference to FIG. 2, the distance measured in the "z" direction through node 103 in 2D grid 100 between optical origin 106 and point "p" may be used as a corresponding depth value.

A "density map" is another of 2D representation for a 3D dataset. A density map may be formed by assigning a "density value" to each node in the projection plane. Each density value indicates, for example, how many points in the 3D dataset (e.g., 3D point cloud 102) project onto or near (within defined tolerances) a particular node in a projection plane (e.g., 2D grid 100). For example, where multiple points in 3D point cloud 102 project onto or near a particular node in the projection plane, that node is assigned a relatively larger density value in comparison with another node in the projection plane onto which fewer (or no) points project.

The 2D mesh is formed by first defining each node in the projection pane as either an "interior node" or an "exterior node"—depending on the density value assigned to the node. In general, a node having a density value greater than or equal to a density value threshold "$d_{iso}$" is considered an interior node while a node having a density value less than the density value threshold $d_{iso}$ is considered an exterior node.

Interior nodes correspond to areas of the projection plane onto which points in the 3D point cloud are projected. In contrast, exterior nodes correspond to areas of the projection plane onto which few (or no) points in the 3D point cloud are projected. Accordingly, interior nodes are used to form the 2D mesh representing the 3D surface while exterior nodes are not included in the 2D mesh.

The 2D mesh comprises interior nodes and connections between the interior nodes. The 2D mesh may further comprise "interpolated nodes" located between adjacent interior and exterior nodes in the projection plane and connections between the interpolated nodes and the interior nodes.

Figure 3:
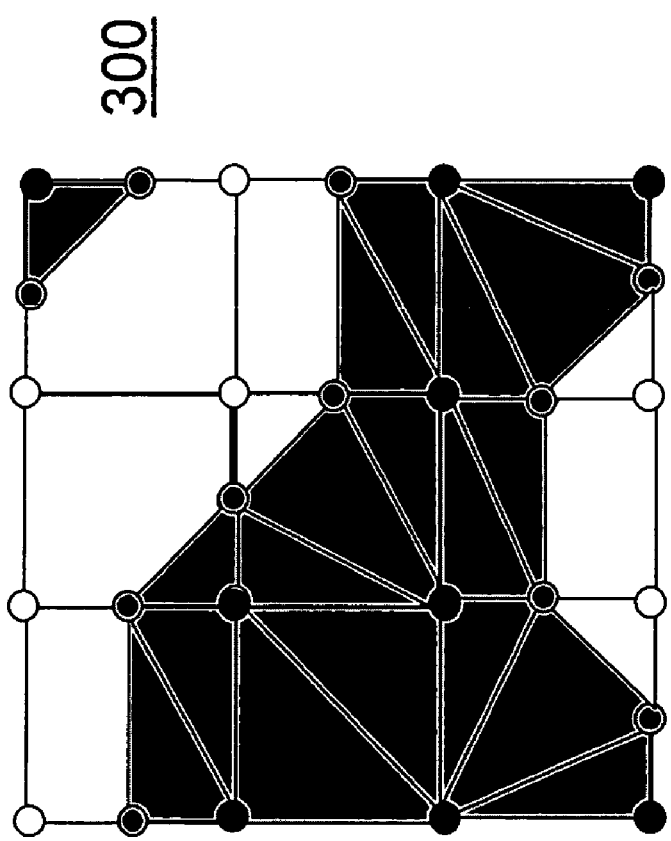
FIG. 3 shows an exemplary 2D mesh formed in a 4×4 section of a 2D grid.

FIG. 3 shows an exemplary 2D mesh 300 formed by connecting internal nodes and interpolated nodes in a 4×4 section of 2D grid 100. In FIG. 3, internal nodes are shown by black circles, external nodes are shown by white circles, and interpolated nodes are shown by gray circles. The internal and interpolated nodes are connected to form triangles (shown in gray) according to a set of mesh patterns (e.g.,) 400 through 415 shown in FIG. 4. Mesh patterns 400 through 415 define connectivities for triangles formed in the 2D mesh for all combinations of interior and exterior nodes in a square grid cell. Since a square grid cell has four (4) nodes, there are $(2)^4$, or 16 different ways of defining combinations of interior and exterior nodes for a square grid cell. These different ways are represented one-for-one by mesh patterns 400 through 415 shown in FIG. 4.

Naturally, if the grid cells of the projection in use were not squares defined by four (4) corner nodes, as in the illustrated example, a different number and type of mesh patterns would result. Indeed, a grid cell might be defined by any reasonable number of nodes. In addition, any reasonable number of interpolated nodes might be placed between a pair of adjacent nodes in a projection plane to form a corresponding 2D mesh. Furthermore, connectivities defined by the mesh patterns need not necessarily be triangular in form. For instance, the mesh patterns could define arbitrary polygonal shapes. Accordingly, a much wider variety of mesh patterns than those shown in FIG. 4 could be used to form a 2D mesh.

Figure 4:
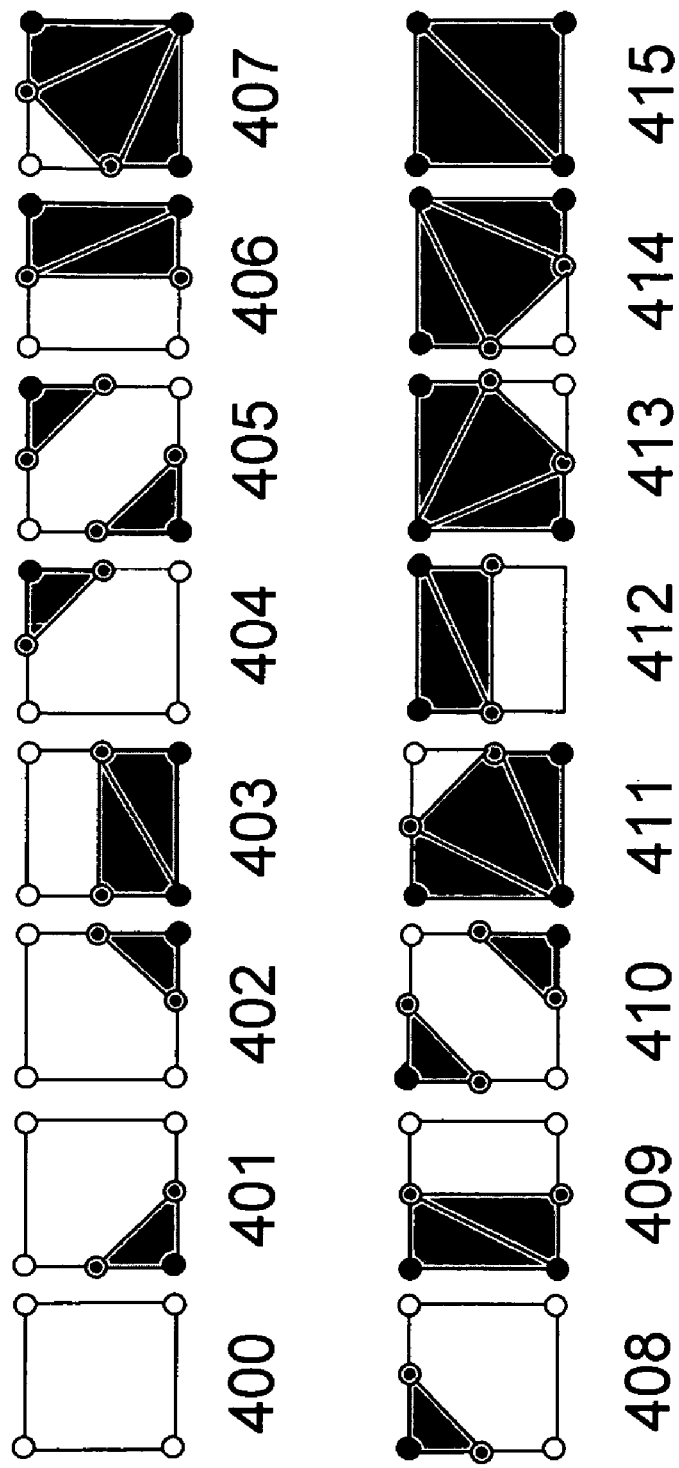
FIG. 4 illustrates mesh patterns used to form a 2D mesh according to selected embodiments of the invention.

This having been said, however, at least one embodiment of the invention recognizes significant benefits of forming a 2D mesh using the triangular mesh patterns shown in FIG. 4. This embodiment takes full advantage of the benefits provided by modern graphics processing systems which tend to be optimized for processing (e.g., rendering and displaying) mesh structures formed from triangles.

The 2D mesh defined above may subsequently be used in conjunction with a corresponding depth map to generate 3D graphics primitives. The connectivity of the 2D mesh defines the topology of the 3D graphics primitives and the depth map defines the 3D location of vertices for the graphics primitives. The term "graphics primitive" is used herein to denote any basic element used to construct larger features in a graphics display or model. For example, the term "graphics primitive" may refer to a point, a line, and/or a polygon.

The following description provides one specific example of how to generate a 3D surface defined by the boundary of 3D point cloud 102 shown in FIG. 2 according to one embodiment of the invention.

In this example it is assumed that 3D point cloud 102 comprises a plurality of 3D points "p". Each point "p" in 3D point cloud 102 is represented by homogeneous coordinates $p=[x, y, z, 1]^T$. 3D points "p" are transformed into projected points having projected coordinates $[x', y', z', w]^T$ using a projection matrix "P" according to the following equation (1):

$$\begin{bmatrix} x' \\ y' \\ z' \\ w \end{bmatrix} = P \begin{bmatrix} x \\ y \\ z \\ 1 \end{bmatrix}. \quad (1)$$

In equation (1), projection matrix "P" is a 4×4 invertible matrix having an inverse $P^{-1}=Q$ used to transform the projected points back into 3D space after a 2D mesh is formed. Projection matrix "P" comprises entries $p_{ij}$ where "i" denotes a row of the matrix and "j" denotes a column of the matrix.

In one embodiment of the invention, projection matrix "P" is defined as a perspective projection matrix defined according to the Open Graphics Library (OpenGL) standard. Projection matrix "P" can be obtained, for example, by making a series of function calls in OpenGL to specify specific parameters for the transformation, such as an aspect ratio of the projection plane, a viewpoint, near and far clipping planes, etc. The following is an exemplary set of function calls used to obtain projection matrix "P" in OpenGL:

glMatrixMode(GL_PROJECTION);
    glLoadIdentity( );
    gluPerspective(fovy, aspect, near, far);
    gluLookAt(eye.x, eye.y, eye.z, center.x, center.y, center.z, up.x, up.y, up.z);

A detailed description of these function calls can be found, for example, in "OpenGL Programming Guide: The Official Guide to Learning OpenGL, Version 1.4, Fourth Edition", by Dave Shreiner et al.

The exemplary function calls are provided as a teaching example. The projection matrix could be obtained using other function calls such as those defined in DirectX, or alternatively, it could be constructed from scratch.

The inverse of projection matrix "P" can be computed using any of several well known matrix inversion methods. For example, projection matrix "P" can be inverted by computing its adjoint and dividing the adjoint by the determinant of "P".

Dividing projected coordinates x', y', and z' by "w" yields "canonical coordinates" defined on a range from −1 to 1. Another term for the canonical coordinates is "normalized device coordinates". Coordinate z' represents a depth for a corresponding point "p" relative to an optical origin or a camera. In order to avoid introducing distortion into the depth map, coordinate z' is not divided by "w".

Projected coordinates x' and y' are converted into canonical coordinates and then transformed into projected coordinates $x_p$ and $y_p$ in respective ranges [0 ... W] and [0 ... H], while a projected coordinate $z_p$ is defined as z'. The transformation of projected coordinates x', y', z' into projected coordinates $x_p$, $y_p$, and $z_p$ is performed according to the following equation (2):

$$\begin{bmatrix} x_p \\ y_p \\ z_p \end{bmatrix} = \begin{bmatrix} W\left(\frac{1}{2} + \frac{1}{2}x'/w\right) \\ H\left(\frac{1}{2} + \frac{1}{2}y'/w\right) \\ z' \end{bmatrix}. \quad (2)$$

Since projected coordinates $x_p$ and $y_p$ are defined on respective ranges [0 ... W] and [0 ... H], these coordinates are readily mapped onto 2D grid 100.

Depth and density values for 2D grid 100 are defined in relation to projected coordinates $x_p$, $y_p$, and $z_p$. However, because projected coordinates $x_p$ and $y_p$ do not necessarily map directly onto nodes in 2D grid 100, the depth and density values assigned to each node typically take into consideration any projected points whose corresponding projected coordinates $x_p$ and $y_p$ are close to the node.

Figure 5:
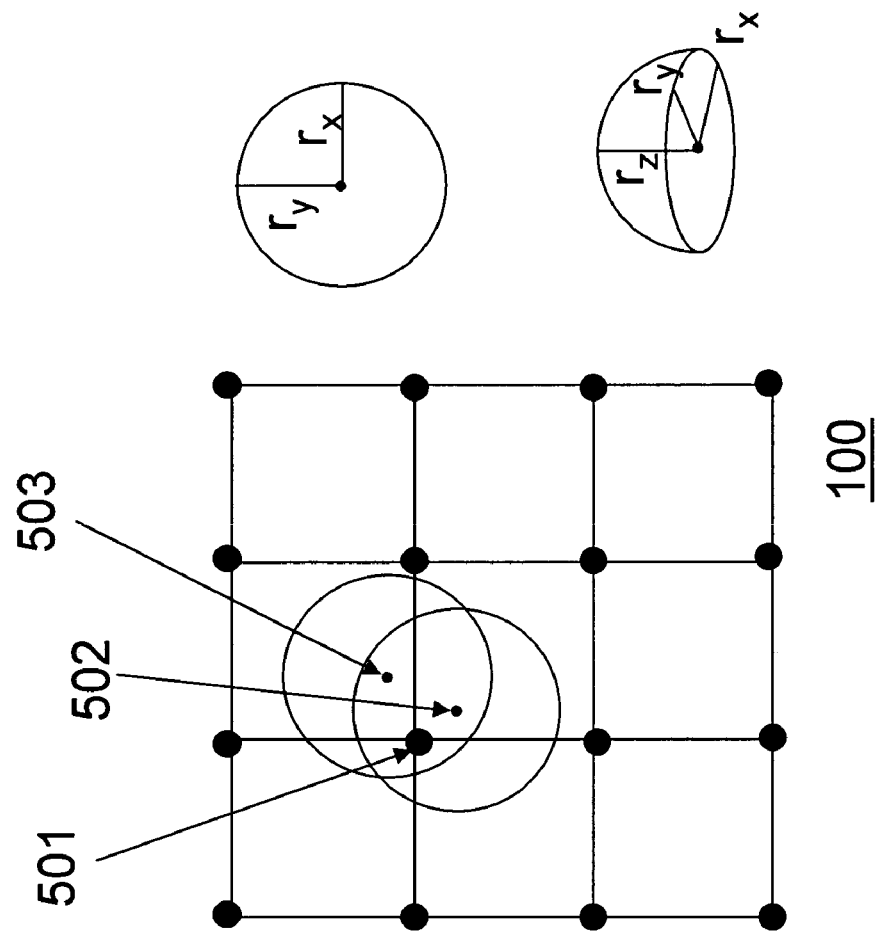
FIG. 5 shows a 4×4 section of a 2D grid where two points are projected near a node.

For example, FIG. 5 shows a 4×4 section of 2D grid 100 with projected points 502 and 503 located near a node 501. Each of projected points 502 and 503 is characterized by projected radii $r_x$, and $r_y$, and $r_z$ in the respective "x", "y", and "z" directions. In general, projected radii $r_x$, $r_y$, and $r_z$ denote axes of ellipsoids defined in relation to each of the projected points. For purposes of this discussion, it is assumed that $r_x = r_y = r_p$, and therefore each of the projected points defines a circle of radius $r_p$ in a plane of 2D grid 100.

A depth value is assigned to node 501 by taking a minimum of two depth values defined by respective projected points 502 and 503 in relation to node 501. A density value is assigned to node 501 by taking a sum of two density values defined by projected points 502 and 503 in relation to node 501. In general, a node only takes into account depth and density values defined by projected points within a specific range of the node. For instance, where a distance from the node to a projected point is greater than the projected radius $r_p$ of the projected point, the projected point is generally not considered when calculating depth and density values for the node. More specifically, for a node at a location (i,j) in grid 100, only projected nodes satisfying the equation $(ih-x_p)^2 + (jh-y_p)^2 \leq r_p$ are considered when computing depth and density values for that node.

A depth value $\delta_{i,j,p}$ is defined by a projected point "p" in relation to a particular node at location (i,j) in 2D grid 100 according to the following equation (3):

$$\delta_{i,j,p} = z_p - r_z\left(1 - \frac{(ih-x_p)^2 + (jh-y_p)^2}{r_p^2}\right). \quad (3)$$

In order to assign the node at location (i,j) with the minimum depth value defined in relation thereto, a depth value $z_{i,j}$ corresponding to the node is initialized to infinity (∞) and then successively updated as new depth values are defined by more projected points. For each new depth value $\delta_{i,j,p}$, depth value $z_{i,j}$ is updated according to the following equation (4):

$$z_{i,j} = \min(z_{i,j}, \delta_{i,j,p}). \quad (4)$$

A density value $\psi_{i,j,p}$ is defined by a projected point "p" in relation to a particular node at location (i,j) in 2D grid 100 according to the following equation (5):

$$\psi_{i,j,p} = 1 - \frac{(ih-x_p)^2 + (jh-y_p)^2}{r_p^2}. \quad (5)$$

In order to assign the node at location (i,j) with the sum of the density values defined in relation thereto, a density value $d_{i,j}$ corresponding to the node is initialized to zero (0) and then successively updated as new density values are defined by more projected points. For each new density value $\psi_{i,j,p}$, depth value $z_{i,j}$ is updated according to the following equation (6):

$$d_{i,j} = d_{i,j} + \psi_{i,j,p}. \quad (6)$$

Equations (3) and (5) both use a kernel function $$1 - \frac{(ih-x_p)^2 + (jh-y_p)^2}{r_p^2}$$

to weight projected points based on their distance from the node at location (i,j). This particular kernel function is used as an example, and many other weightings are possible.

The 2D mesh is formed after the density and depth maps. As described previously, a density value threshold $d_{iso}$ is used to define nodes in 2D grid 100 as interior nodes and exterior nodes. Where a node at a location (i,j) has a density value $d_{i,j}$ less than $d_{iso}$, the node is defined as an exterior node. Where the node has a density value $d_{i,j}$ greater than or equal to $d_{iso}$, the node is defined as an interior node.

Interpolated nodes between pairs of adjacent interior and exterior nodes are assigned specific coordinates by some form of interpolation between interior and/or exterior nodes in each cell. In this example, linear interpolation is used. For instance, an interpolated node "$n_1$" between interior/exterior nodes "$n_2$" and "$n_3$" is assigned coordinates "$c_1$"=$[x_p, y_p, z_p]^T =$ $$\frac{d_2 - d_{iso}}{d_2 - d_1}c_2 + \frac{d_{iso} - d_1}{d_2 - d_1}c_3,$$

where "$c_2$" and "$c_3$" are the respective coordinates of nodes "$n_2$" and "$n_3$", where the coordinates of an interior or exterior node at a location (i,j) are defined as $[ih, jh, z_{i,j}]^T$. Where the interpolated node is located adjacent to an exterior node having a depth value of infinity (∞), the interior node is assigned coordinates "$x_p$" and "$y_p$" between nodes "$n_2$" and "$n_3$", and a coordinate "$z_p$" equal to a maximum non-infinity depth-value of nodes in cells touching the interpolated node.

Once the interpolated nodes are assigned specific coordinates, each cell in 2D grid 100 is mapped onto one of mesh patterns 400 through 415. It is noted that each of the mesh patterns does not necessarily define a unique triangulation for a particular combination of interior and exterior nodes. For example, mesh pattern 415 could alternatively be triangulated by drawing a line from the upper left interior node to the lower right interior node instead of from the lower left interior node to the upper right interior node.

Each of the nodes in the 2D mesh, including the interior and interpolated nodes is transformed back into 3D space using matrix "Q" described above. Each node transformed into 3D space constitutes a vertex of a 3D polygon such as a 3D triangle. For each node defined by coordinates $[x_p, y_p, z_p]^T$, the transformation to 3D space is performed by the following equation (7):

$$\begin{bmatrix} x \\ y \\ z \\ 1 \end{bmatrix} = Q \begin{bmatrix} (-1 + 2x_p/W)w \\ (-1 + 2y_p/H)w \\ z_p \\ w \end{bmatrix}. \quad (7)$$

Since some of the coordinates are obtained by linear interpolation, the parameter "w" is not necessarily defined for each node. However, it can be obtained from known quantities according to the following equation (8):

$$w = \frac{1 - q_{4,3}z_p}{q_{4,1}(-1 + 2x_p/W) + q_{4,2}(-1 + 2y_p/H) + q_{4,4}}. \quad (8)$$

The coordinates transformed into 3D space are rendered as 3D polygons in the virtual display system.

In most graphics applications, it is beneficial to define a normal for each vertex of a 3D polygon. Among other things, this enables effective lighting and shading to take place on each of the 3D polygons. In one embodiment of the invention, each vertex normal is defined as a normalized sum of the normals of adjacent polygons relative to the vertex. In the sum, each normal is weighted by the angle of the corresponding polygon relative to the vertex. The angle "θ" between a polygon having a normal $n_p$ and a particular vertex "v" may be computed, for example, by the equation $$\theta = \cos^{-1}\left(\frac{n_p \cdot v}{|n_p||v|}\right).$$

Using equation (4) to update depth values in 2D grid 100 tends to produce bumpy depth maps. A depth map can be smoothed by applying a filter to depth values in the depth map. For example, each depth value can be replaced with a weighted sum of neighboring depth values.

Figure 6:
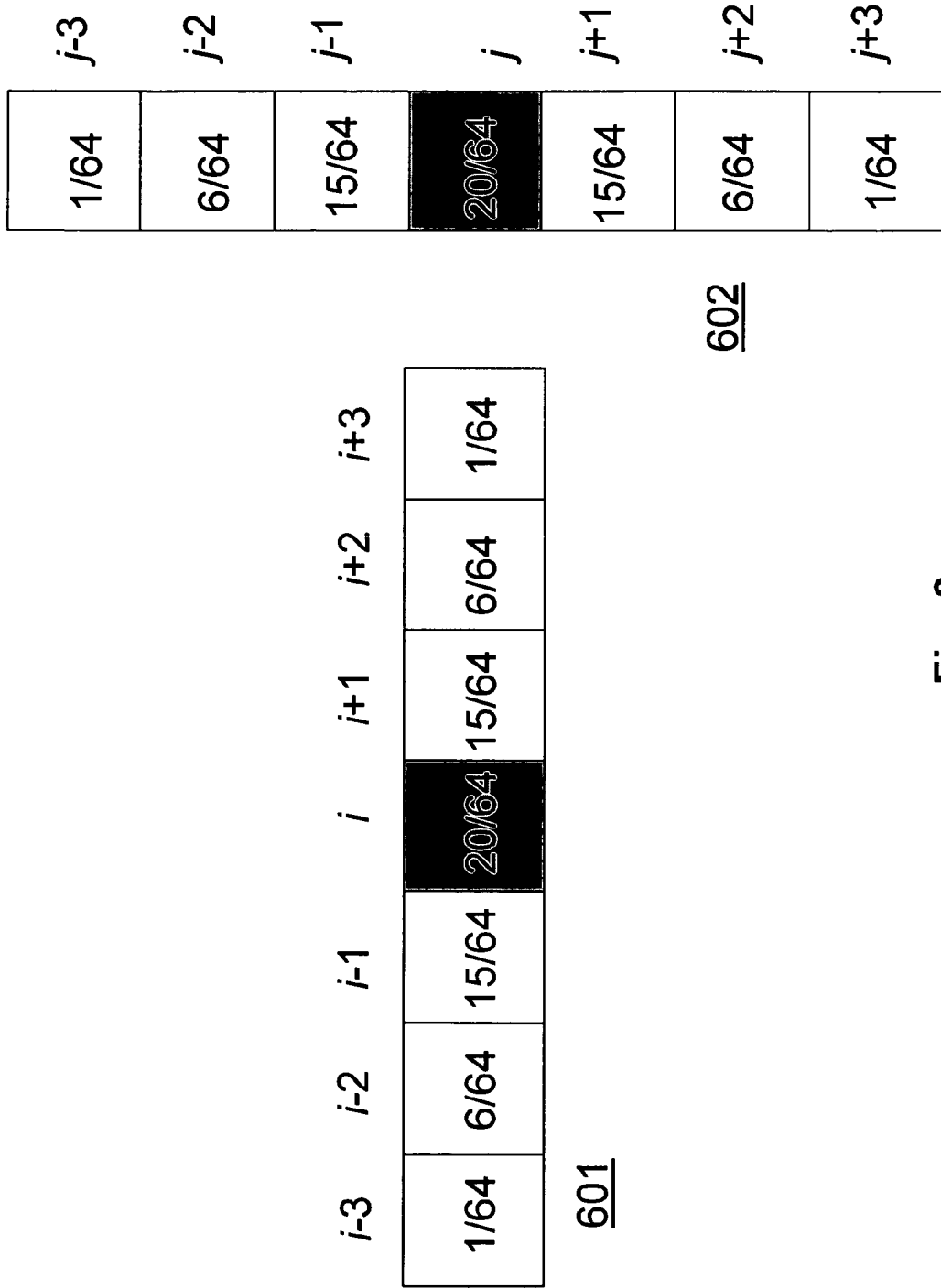
FIG. 6 shows a filter used to smooth depth values in a 2D grid according to one embodiment of the invention.

FIG. 6 shows an example of a filter that could be used to smooth depth values in 2D grid 100. The filter shown in FIG. 6 is a separable binomial filter comprising a horizontal component 601 and a vertical component 602. Filtering with the separable binomial filter is performed in two passes. In a first pass, horizontal component 601 is applied to each depth value in 2D grid 100. Horizontal component 601 replaces a depth value stored at a node at location (i,j) with a weighted sum of neighboring depth values in the "x" direction. Weights applied to neighboring depth values are shown in FIG. 6. For example, a weight applied to a neighboring depth value at a location (i−3,j) is 1/64, and so forth. After the first pass is completed, a second pass applies component 602 to the depth values in 2D grid 100.

Where one of the neighboring depth values for a node is infinity (∞), the filter ignores the depth value for that node as well as a depth value symmetrically opposite from that node relative to the depth value being replaced. This is done so that the filter remains symmetrical and so that depth values are not unnecessarily set to infinity (∞).

In addition to smoothing the depth values, a silhouette of the 2D mesh may also be smoothed to produce more realistic looking 3D surfaces. One way to smooth a silhouette of the 2D mesh is to smooth coordinates $[x_p, y_p]^T$ associated with each interior node in 2D grid 100 lying adjacent to an exterior node. Coordinates $[x_p, y_p]^T$ can be smoothed by replacing the coordinates with averages of the coordinates and all adjacent nodes.

One advantage of using the above method to generate 3D surfaces is that it tends to generate a large number of polygons in areas closer to the optical origin, or camera. Accordingly, a fine level of detail is apparent in close up areas of the 3D surface viewed on the virtual display system. In some cases, however, the large number of polygons is unnecessary for viewing a particular region of a 3D surface. For example, a flat section of a 3D surface can typically be represented by a single polygon. As a result, the amount of time required to render the surface can be reduced by minimizing the number of polygons rendered for the 3D surface.

One way to reduce the number of polygons rendered without compromising details is to simplify the 2D mesh. One way to simplify the 2D mesh is to use a quad-tree hierarchy to combine similar adjacent cells in 2D grid 100. For instance, where a 2×2 (i.e., "quad") group of cells are all characterized by mesh pattern 415 in FIG. 4, all four of the 2×2 cells can be combined into a single cell characterized by mesh pattern 415. Combining the cells raises a "level" of the cells in the quad-tree hierarchy.

In a "restricted" quad-tree hierarchy, adjacent cells are prevented from being combined a significantly different number of times from each other. In other words, the levels of adjacent cells are prevented from differing by more than a predetermined amount. In general, this allows the combined cells in the hierarchy to be represented by a small number of mesh patterns. For example, by ensuring that no two adjacent cells differ by more than one (1) level in the quad-tree hierarchy, combined cells can be rendered according to mesh patterns shown in FIG. 7.

Figure 7:
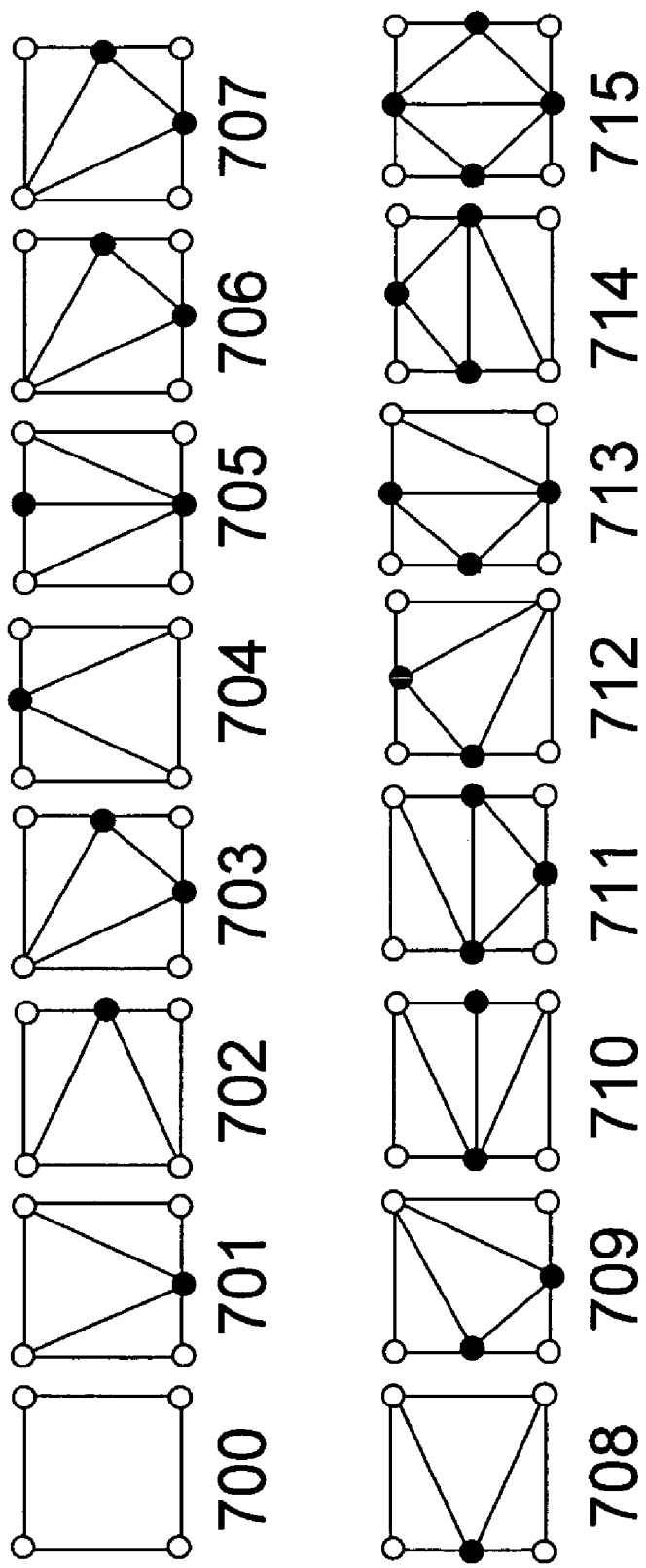
FIG. 7 illustrates mesh patterns used to form a 2D mesh from a plurality of cells formed with a restricted quad-tree hierarchy.

In FIG. 7, each white circle represents a corner node shared by a combined cell and an adjacent cell and each black circle represents a corner node of an adjacent cell having a level one less than the combined cell. The mesh patterns in FIG. 7 can be applied to the combined cells in 2D grid 100 to form the 2D mesh.

Figure 8:
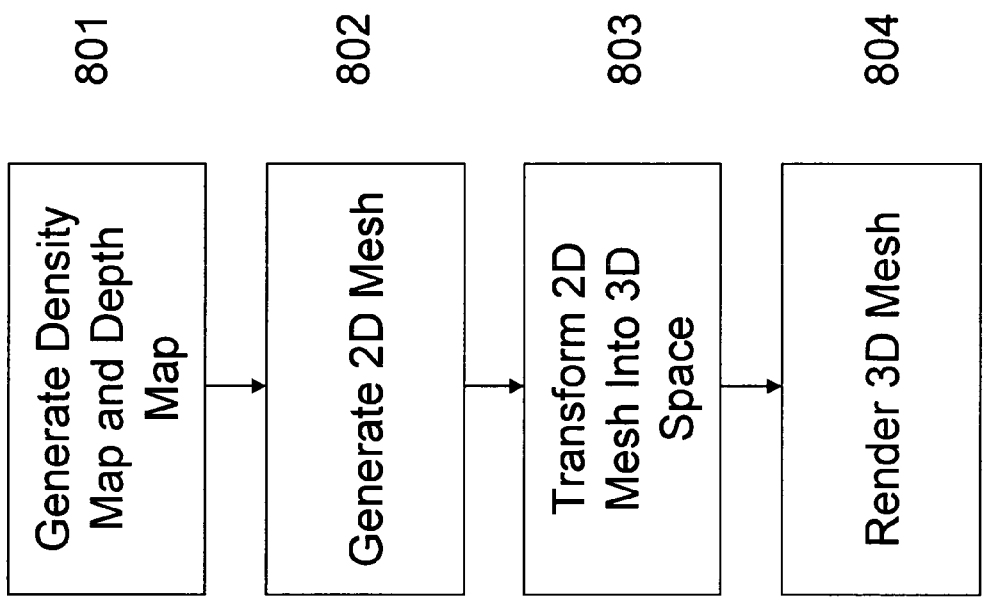
FIG. 8 is a flow chart illustrating a method of generating a 3D surface defined by a 3D point cloud according to one embodiment of the invention.
Figure 9:
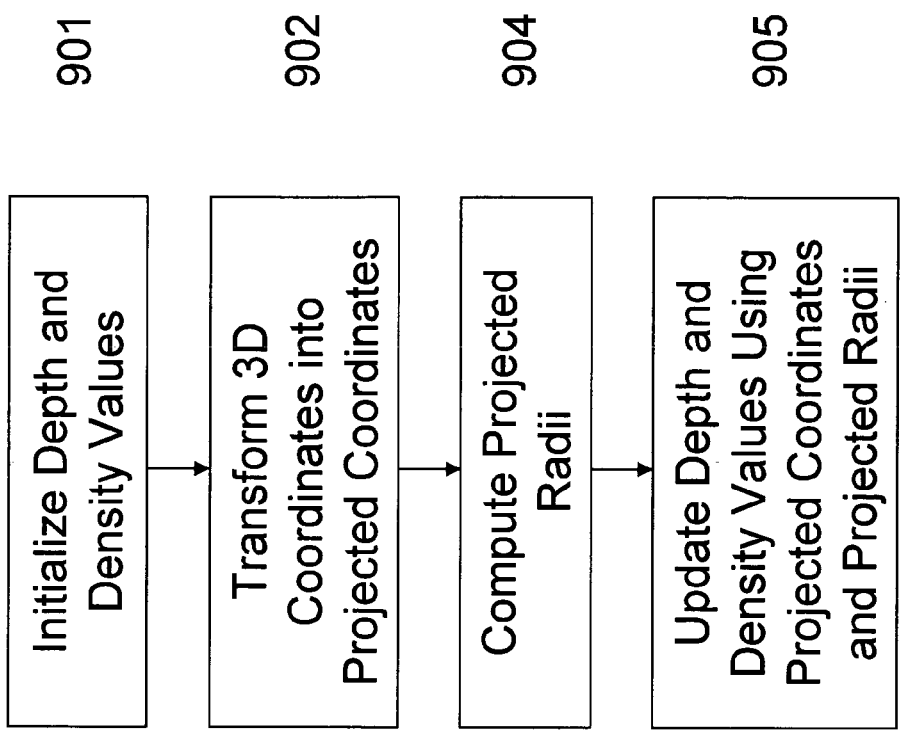
FIG. 9 is a flow chart illustrating a method of generating depth and density maps from a 3D point cloud according to an embodiment of the invention.
Figure 10:
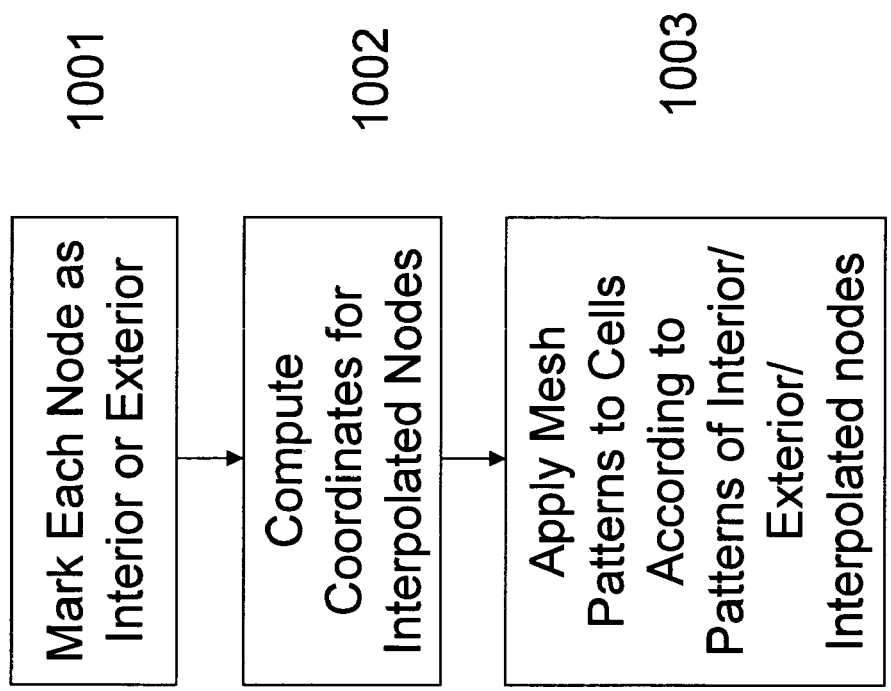
FIG. 10 is a flow chart illustrating a method of forming a 2D mesh using the depth and density maps; and, FIG. 11 is a flow chart illustrating a method of generating 3D polygons from the 2D mesh.
Figure 11:
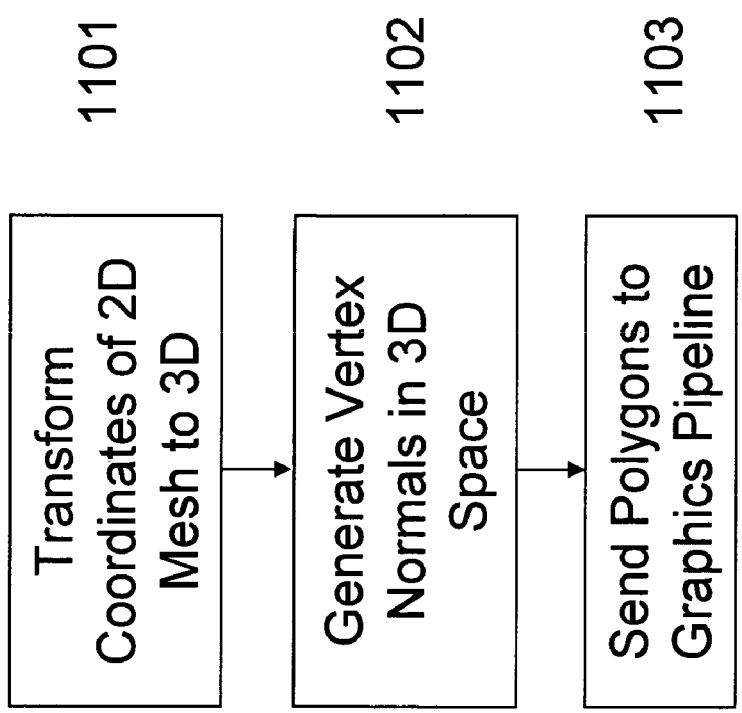

FIGS. 8 through 11 are flow charts illustrating steps used to generate a 3D surface defined by a 3D point cloud according to selected embodiments of the invention. In particular, FIG. 8 is a flow chart illustrating a method of generating a 3D surface defined by a 3D point cloud according to one embodiment of the invention, FIG. 9 is a flow chart illustrating a method of generating depth and density maps from the 3D point cloud, FIG. 10 is a flow chart illustrating a method of forming a 2D mesh using the depth and density maps, and FIG. 11 is a flow chart illustrating a method of generating 3D polygons from the 2D mesh. In this written description, method steps are designated by parentheses to distinguish them from exemplary elements such as those shown in FIGS. 1 through 7.

Referring to FIG. 8, a method of generating a 3D surface defined by a 3D point cloud comprises generating density and depth maps from the 3D point cloud (801). The method further comprises generating a 2D mesh using data in the density and depth maps (802). The method still further comprises transforming the 2D mesh into 3D space (803) and rendering a resulting 3D mesh in a virtual display system (804).

Referring to FIG. 9, a method of generating depth and density maps from the 3D point cloud comprises initializing depth and density values (901), transforming 3D coordinates into projected coordinates (902), computing projected radii for the projected coordinates (903), and updating the depth and density values using the projected coordinates and the projected radii (904).

Referring to FIG. 10, a method of generating a 2D mesh from the depth and density maps comprises marking nodes in a 2D grid as interior nodes or exterior nodes based on the density map (1001). The method further comprises computing coordinates for interpolated nodes in the 2D grid based on density values associated with the interior and exterior nodes (1002). The method further comprises applying a plurality of predetermined mesh patterns to cells in the 2D grid defined by the interior, exterior, and interpolated nodes (1004).

Referring lastly to FIG. 11, a method of generating 3D polygons from the 2D mesh comprises transforming coordinates of the 2D mesh into 3D (1101) and using the transformed 3D coordinates in conjunction with the connectivity of the 2D mesh to define 3D polygons. The method further comprises generating vertex normals for the 3D coordinates (1102), and sending the 3D polygons to a graphics rendering pipeline (1103).

Embodiments of the present invention find ready application in various fields related to computer graphics, 3D modeling, and physical simulations. As an example, one of the main applications for various embodiments of the invention is the visualization of particle based fluids models such as those based on Smoothed Particle Hydrodynamics (SPH). In a particle based fluids model, particles can be modeled as points in a 3D point cloud and forces and interactions relating to each of the particles can be defined relative to corresponding points. In order to visualize the particles, embodiments of the invention are used to efficiently generate a 3D surface defined by a boundary of the 3D point cloud. In these cases, the 3D surface may have the appearance of a fluid such as a flowing liquid or gas such as water, fog, lava, etc.

Embodiments of the present invention provide several benefits over conventional methods. For example, using the 2D grid to generate the 3D surface rather than marching through a 3D dataset tends to make embodiments of the present invention much faster than the Marching Cubes approach. In addition, by forming the mesh in 2D, parts of the 3D surface closer to the optical point of origin are constructed with more polygons (e.g., triangles) than parts of the 3D surface further from the optical point of origin. Accordingly, a finer level of detail is rendered closer to the optical point of origin. Moreover, in contrast to other techniques that operate on a 2D grid, such as ray tracing and point splatting, embodiments of the invention perform transformations between 2D and 3D to enable the 3D surfaces to be properly shaded, lighted, and finally rendered using specialized polygon rendering hardware. Finally, by operating on data in the 2D mesh, the 3D surface is readily smoothed, and silhouettes of the 3D surface are also readily smoothed.

The foregoing exemplary embodiments are teaching examples. Those of ordinary skill in the art will understand that various changes in form and details may be made to the exemplary embodiments without departing from the scope of the present invention which is defined by the following claims.

What is claimed:

1. A computer-implemented method of generating a three-dimensional (3D) surface from a plurality of 3D points, the method comprising:
    initializing a plurality of depth values and a plurality of density values on a 2D projection plane, wherein the 2D projection plane is generated by a processing unit;
    projecting the plurality of 3D points onto the 2D projection plane to generate a plurality of projected points in the projection plane;
    generating a depth map by updating the plurality of depth values according to coordinates associated with the plurality of projected points;
    generating a density map by updating the plurality of density values according to the coordinates associated with the plurality of projected points;
    generating a two-dimensional (2D) mesh from the depth map and the density map; and
    transforming the 2D mesh into a 3D mesh for storage in a memory or display on a display screen.

2. The method of claim 1, wherein the 2D projection plane comprises a 2D grid characterized by a plurality of cells defined by a plurality of nodes, wherein each of the nodes is characterized by a depth value, a density value, and by a location in the projection plane, and wherein the depth value and the location of each node in the projection plane define coordinates for the node.

3. The method of claim 2, wherein the 2D grid is a rectangular grid.

4. The method of claim 2, wherein updating the depth values according to the coordinates of the projected points comprises:
    computing projected radii for each of the projected points;
    replacing each existing depth value stored at each node in the 2D grid with a minimum of the existing depth value and depth coordinates of projected points separated from the node by less than a predetermined projected radius.

5. The method of claim 4, wherein updating the density values according to the coordinates of the projected points comprises:
    replacing each existing density value stored at each node in the 2D grid with a sum of the existing density value and density values of projected points separated from the node by less than a predetermined projected radius.

6. The method of claim 5, wherein the depth coordinate and density value of each projected point is weighted according to the distance of the projected point from a node in the 2D grid.

7. The method of claim 6, wherein projecting the 3D points onto the 2D projection plane comprises:
    multiplying each of the 3D points by a projection matrix.

8. The method of claim 7, generating the 2D mesh comprises:
    designating each node in the 2D grid as an interior node or an exterior node; and,
        applying one of a plurality of mesh patterns to each cell in the 2D grid based on a pattern of interior and exterior nodes in the cell;
    wherein the mesh patterns define connectivities for polygons formed in the 2D mesh.

9. The method of claim 8, wherein designating each node in the 2D grid as an interior node or an exterior node comprises:
    upon determining that a density value of the node is greater than or equal to a density threshold, designating the node as an interior node; and, upon determining that the density value of the node is less than the density threshold, designating the node as an exterior node.

10. The method of claim 9, further comprising:
defining interpolated nodes between adjacent interior and exterior nodes;
wherein vertices of the polygons are defined by the interior and interpolated nodes.

11. The method of claim 10, wherein transforming the 2D mesh into a 3D mesh comprises:
multiplying the coordinates of each node by an inverse of the projection matrix.

12. The method of claim 11, further comprising:
sending 3D polygons defined by the 3D mesh to a graphics rendering pipeline.

13. The method of claim 8, wherein the polygons comprise triangles.

14. The method of claim 12, further comprising:
before sending the 3D polygons to the graphics rendering pipeline, defining vertex normals for each vertex in the 3D polygons.

15. The method of claim 14, wherein each vertex normal is computed as a weighted sum of the normals of polygons containing the vertex;
wherein the weight of each normal in the sum is proportional to an angle between the normal and the vertex.

16. The method of claim 10, wherein coordinates for each interpolated node are determined by linear interpolation of the adjacent interior and exterior nodes.

17. The method of claim 1, wherein each of the plurality of 3D points represents a particle in a particle based fluids model.

18. The method of claim 1, wherein the 3D surface is generated by a computational platform including at least one of a physics processing unit (PPU), a graphics processing unit (GPU) and a central processing unit (CPU).

19. The method of claim 1, further comprising:
after generating the depth map, smoothing the depth values by applying a filter thereto.

20. The method of claim 19, wherein the filter is a separable binomial filter.

21. The method of claim 8, further comprising:
smoothing a silhouette of the 2D mesh by smoothing coordinates of each interior node in the 2D grid lying adjacent to an exterior node.

22. The method of claim 8, further comprising:
simplifying the 2D mesh by combining similar adjacent cells in the 2D grid using a quad-tree hierarchy.

23. The method of claim 22, wherein the quad-tree hierarchy is a restricted quad-tree hierarchy wherein adjacent cells in the 2D grid are prevented from differing by more than one level.

* * * * *